United States Patent
Ishii (10) Patent No.: US 9,291,480 B2
(45) Date of Patent: Mar. 22, 2016

(54) ELECTROMAGNETIC INDUCTION TYPE POSITION DETECTOR

(71) Applicant: MITSUBISHI HEAVY INDUSTRIES, LTD., Tokyo (JP)

(72) Inventor: Koh Ishii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 13/776,018

(22) Filed: Feb. 25, 2013

(65) Prior Publication Data

US 2013/0226510 A1    Aug. 29, 2013

(30) Foreign Application Priority Data

Feb. 27, 2012   (JP) .................................. 2012-039627

(51) Int. Cl.
    G01C 9/00    (2006.01)
    G01D 5/20    (2006.01)

(52) U.S. Cl.
    CPC .............. *G01D 5/2086* (2013.01); *G01D 5/208* (2013.01)

(58) Field of Classification Search
    CPC .............................. G01D 5/208; G01D 5/2086
    USPC ........................................................ 702/150
    See application file for complete search history.

(56) References Cited

U.S. PATENT DOCUMENTS

| | | | |
|---|---|---|---|
| 6,369,564 B1 * | 4/2002 | Khalfin et al. | 324/207.17 |
| 6,636,035 B2 * | 10/2003 | Kiriyama et al. | 324/207.17 |
| 8,222,891 B2 * | 7/2012 | Steinke et al. | 324/207.17 |
| 8,872,466 B2 * | 10/2014 | Tamai et al. | 318/721 |

FOREIGN PATENT DOCUMENTS

| | | |
|---|---|---|
| JP | 61-292014 A | 12/1986 |
| JP | 3046959 B1 | 5/2000 |
| JP | 2009-192293 A | 8/2009 |
| JP | 2010-145149 A | 7/2010 |

OTHER PUBLICATIONS

Japanese Notice of Allowance for Japanese Application No. 2012-039627, dated Dec. 1, 2015, with an English translation.

* cited by examiner

*Primary Examiner* — Tung S Lau
*Assistant Examiner* — Xiuquin Sun
(74) *Attorney, Agent, or Firm* — Birch, Stewart, Kolasch & Birch, LLP (57) ABSTRACT

A control unit of a linear scale includes: excitation current supplying device for causing excitation currents each having two different angular frequencies to flow through slider coils; sampling device for sampling induced voltage V induced in a scale coil, at a timing of $t=(2j+1)\pi/(2\omega)$ (j: an integer); position detecting device for calculating Va(j) which is a sum of samples of the induced voltage at multiple sampling points, calculating an excitation position α at which the Va(j) is equal to 0, and setting the α as a detected position X; and abnormality detecting device for calculating Vb(j) which is a sum of absolute values of the induced voltage at multiple sampling points, comparing the Vb(j) with a threshold value, and determining that the electromagnetic induction type position detector is in an abnormal state when the Vb(j) is equal to or lower than the threshold value.

9 Claims, 2 Drawing Sheets

ELECTROMAGNETIC INDUCTION TYPE POSITION DETECTOR

TECHNICAL FIELD

The present invention relates to an electromagnetic induction type position detector such as a linear scale.

BACKGROUND ART

Inductosyn scales which are electromagnetic induction type position detectors are used in position detection units of various machines such as machine tools, automobiles, and robots. The inductosyn scales include a linear scale and a rotary scale. The linear scale is installed in, for example, a linear moving portion such as a linear moving shaft of a machine tool and detects a linear moving position of the moving portion. The rotary scale is installed in, for example, a rotating portion such as a rotating shaft of a machine tool and detects a rotating position (rotating angle) of the rotating portion.

The linear scale and rotary scale both detect a position by use of electromagnetic induction in coil patterns which are arranged in parallel to face each other. The principle of this detection is described based on principle diagrams of FIGS. 2A to 2C.

Figure 2A:
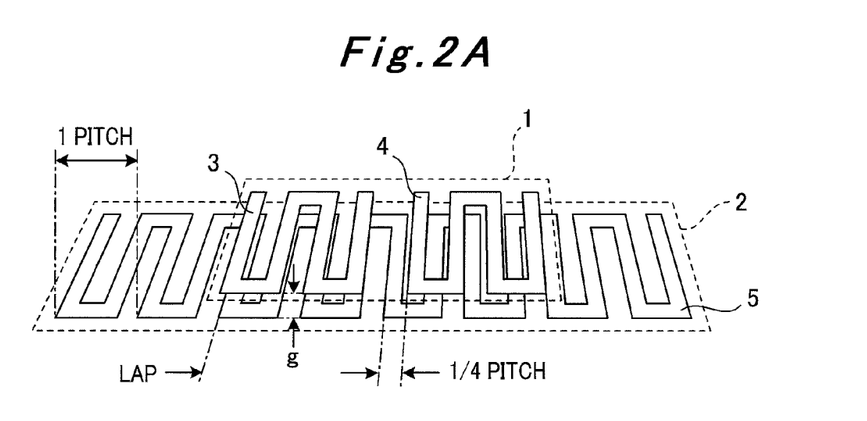
FIG. 2A is a perspective view showing a state where a slider and a scale of a linear scale are arranged in parallel to face each other.
Figure 2B:
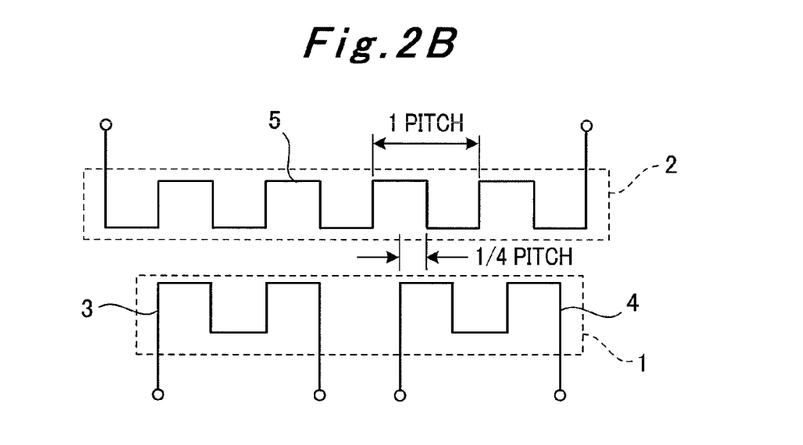
FIG. 2B is a view in which the slider and the scale are arranged next to each other.
Figure 2C:
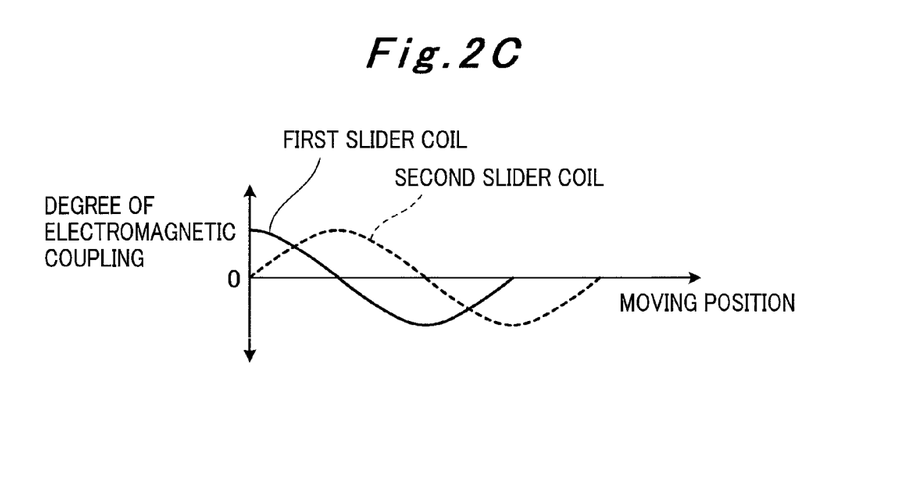
FIG. 2C is a view showing a degree of electromagnetic coupling between the slider and the scale.

FIG. 2A is a perspective view showing a state where a slider and a scale of the linear scale are arranged in parallel to face each other. FIG. 2B is a view showing the slider and the scale side by side. FIG. 2C is a view showing a degree of electromagnetic coupling between the slider and the scale.

Although, FIGS. 2A to 2C show the principle diagrams of the linear scale, the principle of the rotary scale is similar to this and a stator and a rotor of the rotary scale correspond respectively to the slider and the scale of the linear scale.

As shown in FIGS. 2A and 2B, a detection unit of the linear scale includes a slider 1 which is a primary-side member and a scale 2 which is a secondary-side member.

The slider 1 is a movable portion and includes a first slider coil 3 which is a first primary-side coil and a second slider coil 4 which is a second primary-side coil. The scale 2 is a fixed portion and includes a scale coil 5 which is a secondary-side coil. Each of these coils 3, 4, and 5 are formed to bend back and forth in a zigzag shape and to have a linear shape as a whole.

As shown in FIG. 2A, the slider 1 (the first slider coil 3 and the second slider coil 4) and the scale 2 (the scale coil 5) are arranged in parallel to face each other with a predetermined gap g maintained therebetween. Moreover, as shown in FIGS. 2A and 2B, the first slider coil 3 and the second slider coil 4 are shifted from each other by ¼ pitch.

In the linear scale, when an excitation current (an alternating current) flows through the first slider coil 3 and the second slider coil 4, as shown in FIG. 2C, the degree of electromagnetic coupling between the scale coil 5 and each of the first slider coil 3 and the second slider coil 4 changes periodically depending on change in relative position relationship between the scale coil 5 and each of the first slider coil 3 and the second slide coil 4 which is caused by the movement of the slider 1. Accordingly, an induced voltage which changes periodically is generated in the scale coil 5.

Specifically, a control unit of the linear scale causes a first excitation current Ia expressed by the following formula (1) to flow through the first slider coil 3 and causes a second excitation current Ib expressed by the following formula (2) to flow through the second slider coil 4.

$$Ia = -I\cos(k\alpha)\sin(\omega t) \quad (1)$$

$$Ib = I\sin(k\alpha)\sin(\omega t) \quad (2)$$

where
I: magnitudes of excitation currents
k: $2\pi/p$
p: a value of one pitch of the coils (a length or an angle in the case of a rotary scale)
ω: an angular frequency of excitation currents (alternating currents)
t: a time point
α: an excitation position As a result, an induced voltage V expressed by the following formula (3) is generated in the scale coil 5 by electromagnetic induction between the scale coil 5 and the group of the first slider coil 3 and the second slider coil 4.

$$V = KI\sin(k(X-\alpha))\sin(\omega t) \quad (3)$$

where
K: a coefficient of transfer depending on a gap g between the scale coil and the group of the first slider coil and the second slider coil and on the angular frequency ω of the excitation currents.
X: displacement of the detection unit (a moving position of the movable portion)

The control unit receives the induced voltage V of the scale coil 5, calculates the value of the excitation position α at which the induced voltage V is equal to 0 (i.e. the excitation position α where X=α is satisfied), and outputs the thus-calculated excitation position α as the detected position X of the slider 1. Moreover, the control unit adjusts the first excitation current Ia and the second excitation current Ib on the basis of the thus-calculated excitation position α. Specifically, the control unit detects the position X of the slider 1 by performing control of satisfying the induced voltage V=0 by causing the position X of the slider 1 to follow the excitation position α to satisfy X=α, and then outputs the thus-detected position X.

Patent Literature 1 shown below is given as an example of a prior art document disclosing the electromagnetic induction type position detector. Patent Literature 1 describes, in claim 1 and the like, a technique in which a first detected position Xp and a second detected position Xm are obtained by using excitation currents Ia and Ib each having different angular frequencies and describes, in claim 3 and the like, a technique in which an alarm is outputted when the absolute value of the difference between Xp and Xm is larger than a threshold value.

CITATION LIST

Patent Literature

{Patent Literature 1} Japanese Patent Application Publication No. 2009-192293

SUMMARY OF INVENTION

Technical Problem

As described above, in the conventional electromagnetic induction type position detector (the linear scale or the like), the position X is detected by performing control of satisfying the induced voltage V=0 by causing the position X of the movable portion (the slider 1 or like) to follow the excitation position α to satisfy X=α. However, when abnormality occurs in the detection unit and the induced voltage V becomes abnormally small, particularly when V becomes equal to 0, V remains to be 0 even if the movable portion (slider 1 or the like) actually moves and the position X thereof changes. Accordingly, the position X of the movable portion (the slider 1 or the like) cannot be accurately detected.

Moreover, in the electromagnetic induction type position detector of Patent Literature 1 described above, abnormality in the scale is detected based on the difference between Xp and Xm. However, to achieve this, it is necessary to provide a filter circuit and a phase detection circuit in the control unit and obtain Xp and Xm. The configuration of the control unit thereby becomes complicated.

In view of the circumstances described above, an object of the present invention is to provide an electromagnetic induction type position detector which is capable of performing abnormality detection of the electromagnetic induction type position detector in a simple process by using excitation currents each having two different angular frequencies with no adverse effect on the position detection accuracy, thereby capable of preventing erroneous detection and improving safety, and which requires no circuits such as a frequency separation filter and a phase detection circuit in a control unit although using the excitation currents each having two different angular frequencies, thereby capable of reducing cost.

Solution to Problem

A first aspect of an electromagnetic induction type position detector for solving the above problem comprises:

a detection unit including a primary-side member and a secondary-side member, the primary-side member including a first primary-side coil and a second primary-side coil, the secondary-side member including a secondary-side coil and arranged in parallel to the primary-side member to face the primary-side member; and a control unit, wherein the control unit includes:

excitation current supplying means for causing a first excitation current Ia to flow through the first primary-side coil and causing a second excitation current Ib to flow through the second primary-side coil, where $Ia = -I \cos(k\alpha)\sin(\omega t) + I' \sin(\omega' t)$ $Ib = I \sin(k\alpha)\sin(\omega t) + I' \cos(\omega' t)$ provided that I, I': magnitudes of the excitation currents k: $2\pi/p$ p: a value of one pitch of the coils $\omega$, $\omega'$: different angular frequencies of the excitation currents and $\omega' = (n+1/2)\omega$ (n: an integer) is satisfied t: a time point $\alpha$: an excitation position;

sampling means for sampling an induced voltage V induced in the secondary-side coil, at a timing of $t=(2j+1)\pi/(2\omega)$ (j: an integer); and abnormality detecting means for selecting samples of the induced voltage V at a plurality of sampling points from the samples of the induced voltage V obtained by the sampling means, calculating Vb(j) which is a sum of absolute values of the samples of the induced voltage V at the sampling points, comparing the thus-calculated Vb(j) with a threshold value L, and determining that the electromagnetic induction type position detector is in an abnormal state when the Vb(j) is equal to or lower than the threshold value L.

A second aspect of the electromagnetic induction type position detector provides the electromagnetic induction type position detector of the first aspect of the present invention in which the abnormality detecting means selects samples of the induced voltage V at sampling points of j, j+1, j+2, and j+3, where j is an even number, from the samples of the induced voltage V obtained by the sampling means, and calculates Vb(j) which is a sum of absolute values |V(j)|, |V(j+1)|, |V(j+2)|, and |V(j+3)| of the samples of the induced voltage V at the sampling points, and compares the thus-calculated Vb(j) with the threshold value L set to be in a range of $0 \leq L < 2K'I'$ (K': a coefficient of transfer depending on a gap between the secondary-side coil and a group of the first primary-side coil and the second primary-side coil and on the angular frequency $\omega'$ of the excitation currents), and determines that the electromagnetic induction type position detector is in an abnormal state when the Vb(j) is equal to or lower than the threshold value L.

A third aspect of the electromagnetic induction type position detector provides the electromagnetic induction type position detector of the first aspect of the present invention in which the abnormality detecting means selects samples of the induced voltage V at sampling points of j, j+1, j+2, and j+3 as well as sampling points of j+4, j+4+1, j+4+2, j+4+3, . . . , j+4u, j+4u+1, j+4u+2, and j+4u+3 (u: an integer), where j is an even number, from the samples of the induced voltage V obtained by the sampling means, and calculates Vb(j) which is a sum of absolute values |V(j)|, |V(j+1)|, |V(j+2)|, |V(j+3)|, |V(j+4)|, |V(j+4+1)|, |V(j+4+2)|, |V(j+4+3)|, . . . , |V(j+4u)|, |V(j+4u+1)|, |V(j+4u+2)|, and |V(j+4u+3)| (u: an integer) of the samples of the induced voltage V at the sampling points, and compares the thus-calculated Vb(j) with the threshold value L set to be within a range of $0 \leq L < 2(u+1)K'I'$ (K': a coefficient of transfer depending on a gap between the secondary-side coil and a group of the first primary-side coil and the second primary-side coil and on the angular frequency $\omega'$ of the excitation currents), and determines that the electromagnetic induction type position detector is in an abnormal state when the Vb(j) is equal to or lower than the threshold value L.

A fourth aspect of the electromagnetic induction type position detector provides the electromagnetic induction type position detector of any one of the first to third aspects of the present invention which further includes position detecting means for selecting samples of the induced voltage V at a plurality of sampling points from the samples of the induced voltage V obtained by the sampling means, calculating Va(j) which is a sum of the samples of the induced voltage V at the sampling points, calculating an excitation position $\alpha$ at which the thus-calculated Va(j) is equal to 0, and setting the thus-calculated $\alpha$ as a detected position X.

A fifth aspect of the electromagnetic induction type position detector provides the electromagnetic induction type position detector of the fourth aspect of the present invention in which the position detecting means selects samples of the induced voltage V at sampling points of j and j+2, where j is an even number, from the samples of the induced voltage V obtained by the sampling means, and calculates Va(j) which is a sum of the samples of V(j) and V(j+2) of the induced voltage V at the sampling points, and calculates the excitation position $\alpha$ at which the thus-calculated Va(j) is equal to 0, and sets the thus-calculated $\alpha$ as the detected position X.

Advantageous Effects of Invention

The first aspect of the present invention provides the electromagnetic induction type position detector including: the detection unit including the primary-side member and the secondary-side member, the primary-side member including the first primary-side coil and the second primary-side coil, the secondary-side member including the secondary-side coil and arranged in parallel to the primary-side member to face the primary-side member; and the control unit, wherein the control unit includes: the excitation current supplying means for causing the first excitation current Ia shown above to flow through the first primary-side coil and causing the second excitation current Ib shown above to flow through the second primary-side coil; the sampling means for sampling the induced voltage V induced in the secondary-side coil, at the timing of $t=(2j+1)\pi/(2\omega)$ (j: an integer); and the abnormality detecting means for selecting the samples of the induced voltage V at the plurality of sampling points from the samples of the induced voltage V obtained by the sampling means, calculating the Vb(j) which is the sum of absolute values of the induced voltage V at the sampling points, comparing the thus-calculated Vb(j) with the threshold value L, and determining that the electromagnetic induction type position detector is in an abnormal state when the Vb(j) is equal to or lower than the threshold value L. Accordingly, the abnormality detection of the electromagnetic induction type position detector can be performed in a simple process by using the excitation currents each having the two different angular frequencies, with no adverse effect on the position detection accuracy. Hence, it is possible to prevent erroneous detection and improve safety. Moreover, although the excitation currents each having the two different angular frequencies are used, the electromagnetic induction type position detector requires no circuits such as a frequency separation filter and a phase detection circuit in the control unit and the cost can be thereby reduced.

The second aspect of the present invention provides the electromagnetic induction type position detector of the first aspect of the present invention in which the abnormality detecting means selects the samples of the induced voltage V at sampling points of j, j+1, j+2, and j+3, where j is an even number, from the samples of the induced voltage V obtained by the sampling means, calculates the Vb(j) which is the sum of absolute values |V(j)|, |V(j+1)|, |V(j+2)|, and |V(j+3)| of the induced voltage V at the sampling points, compares the thus-calculated Vb(j) with the threshold value L set to be in the range of $0 \leq L < 2K'I'$ (K': the coefficient of transfer depending on the gap between the secondary-side coil and the group of the first primary-side coil and the second primary-side coil and on the angular frequency ω' of the excitation currents), and determines that the electromagnetic induction type position detector is in an abnormal state when the Vb(j) is equal to or lower than the threshold value L. Accordingly, the abnormality detection of the electromagnetic induction type position detector can be performed in a simple process by using the excitation currents each having the two different angular frequencies, with no adverse effect on the position detection accuracy. Hence, it is possible to prevent erroneous detection and improve safety. Moreover, although the excitation currents each having the two different angular frequencies are used, the electromagnetic induction type position detector requires no circuits such as a frequency separation filter and a phase detection circuit in the control unit and the cost can be thereby reduced.

The third aspect of the present invention provides the electromagnetic induction type position detector of the first aspect of the present invention in which the abnormality detecting means selects the samples of the induced voltage V at the sampling points of j, j+1, j+2, and j+3 as well as the sampling points of j+4, j+4+1, j+4+2, j+4+3, . . . , j+4u, j+4u+1, j+4u+2, and j+4u+3 (u: an integer), where j is an even number, from the samples of the induced voltage V obtained by the sampling means, calculates the Vb(j) which is the sum of absolute values |V(j)|, |V(j+1)|, |V(j+2)|, |V(j+3)|, |V(j+4)|, |V(j+4+1)|, |V(j+4+2)|, |V(j+4+3)|, . . . , |V(j+4u)|, |V(j+4u+1)|, |V(j+4u+2)|, and |V(j+4u+3)| (u: an integer) of the induced voltage V at the sampling points, compares the thus-calculated Vb(j) with the threshold value L set to be within the range of $0 \leq L < 2(u+1)K'I'$ (K': the coefficient of transfer depending on the gap between the secondary-side coil and the group of the first primary-side coil and the second primary-side coil and on the angular frequency ω' of the excitation currents), and determines that the electromagnetic induction type position detector is in an abnormal state when the Vb(j) is equal to or lower than the threshold value L. Accordingly, the abnormality detection of the electromagnetic induction type position detector can be performed in a simple process by using the excitation currents each having the two different angular frequencies, with no adverse effect on the position detection accuracy. Hence, it is possible to prevent erroneous detection and improve safety. Moreover, although the excitation currents each having the two different angular frequencies are used, the electromagnetic induction type position detector requires no circuits such as a frequency separation filter and a phase detection circuit in the control unit and the cost can be thereby reduced.

The fourth aspect of the present invention provides the electromagnetic induction type position detector of any one of the first to third aspects of the present invention which further includes the position detecting means for selecting the samples of the induced voltage V at the plurality of sampling points from the samples of the induced voltage V obtained by the sampling means, calculating the Va(j) which is the sum of the induced voltage V at the sampling points, calculating the excitation position α at which the thus-calculated Va(j) is equal to 0, and setting the thus-calculated α as the detected position X. Accordingly, the abnormality detection and the position detection of the electromagnetic induction type position detector can be performed in a simple process by using the excitation currents each having the two different angular frequencies, with no adverse effect on the position detection accuracy. Hence, it is possible to prevent erroneous detection and improve safety. Moreover, although the excitation currents each having the two different angular frequencies are used, the electromagnetic induction type position detector requires no circuits such as a frequency separation filter and a phase detection circuit in the control unit and the cost can be thereby reduced.

The fifth aspect of the present invention provides the electromagnetic induction type position detector of the fourth aspect of the present invention in which the position detecting means selects the samples of the induced voltage V at the sampling points of j and j+2, where j is an even number, from the samples of the induced voltage V obtained by the sampling means, calculates the Va(j) which is the sum of the samples of V(j) and V(j+2) of the induced voltage V at the sampling points, calculates the excitation position α at which the thus-calculated Va(j) is equal to 0, and sets the thus-calculated α as the detected position X. Accordingly, the abnormality detection and the position detection of the electromagnetic induction type position detector can be performed in a simple process by using the excitation currents each having the two different angular frequencies, with no adverse effect on the position detection accuracy. Hence, it is possible to prevent erroneous detection and improve safety. Moreover, although the excitation currents each having the two different angular frequencies are used, the electromagnetic induction type position detector requires no circuits such as a frequency separation filter and a phase detection circuit in the control unit and the cost can be thereby reduced.

DESCRIPTION OF EMBODIMENTS

Embodiments of the present invention are described below in detail based on the drawings.

Embodiment 1

Figure 1:
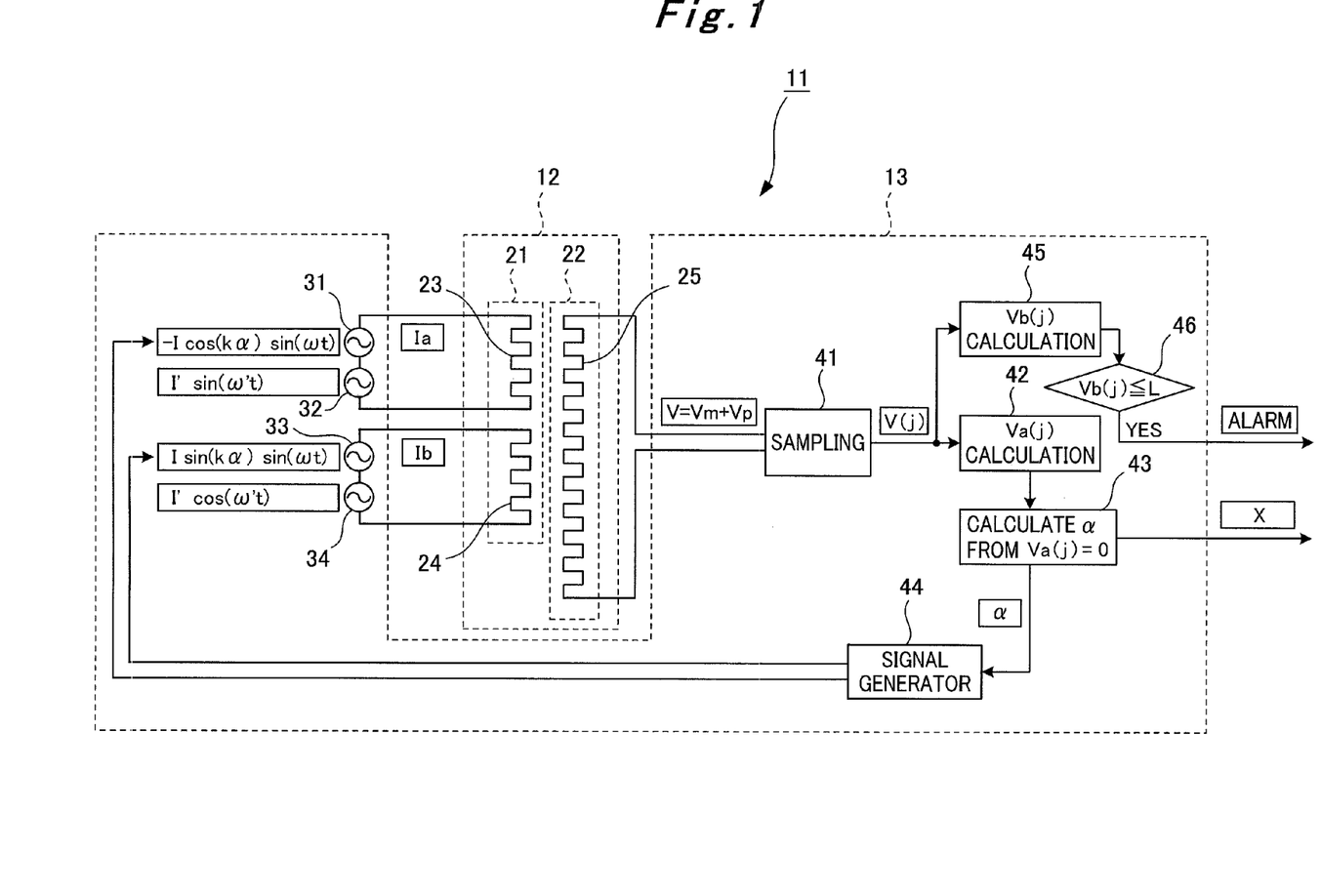
FIG. 1 is a block diagram showing a configuration of an electromagnetic induction type position detector according to an embodiment of the present invention.

An electromagnetic induction type position detector of Embodiment 1 of the present invention is described based on FIG. 1. In the embodiment, a linear scale is given as an example of the electromagnetic induction type position detector to which the present invention is applied.

As shown in FIG. 1, a linear scale 11 which is the electromagnetic induction type position detector includes a detection unit 12 and a control unit 13. The configuration of the detection unit 12 is the same as the configuration of the detection unit of the conventional linear scale (see FIGS. 2A to 2C).

Specifically, the detection unit 12 of the linear scale 11 includes a slider 21 which is a primary-side member and a scale 22 which is a secondary-side member.

The slider 21 is a movable portion and includes a first slider coil 23 which is a first primary-side coil and a second slider coil 24 which is a second primary-side coil. The scale 22 is a fixed portion and includes a scale coil 25 which is a secondary-side coil. Each of these coils 23, 24, and 25 are formed to bend back and forth in a zigzag shape and to have a linear shape as a whole.

Although omitted in the drawing, the slider 21 (the first slider coil 23 and the second slider coil 24) and the scale 22 (the scale coil 25) are arranged in parallel to face each other with a predetermined gap maintained therebetween (see FIG. 2A). Moreover, the first slider coil 23 and the second slider coil 24 are shifted from each other by ¼ pitch (see FIGS. 2A and 2B).

The control unit 13 includes: a first excitation power supply 31, a second excitation power supply 32, a third excitation power supply 33, and a fourth excitation power supply 34 which are excitation current supplying means; a sampling part 41 which is a sampling means for an induced voltage; a Va(j) calculating part 42, an α calculating part 43, and a signal generator 44 which form position detecting means; and a Vb(j) calculating part 45 and an abnormality determination part 46 forming abnormality detection means.

The first excitation power supply 31 and the second excitation power supply 32 are connected in series to the first slider coil 23 of the slider 21 while the third excitation power supply 33 and the fourth excitation power supply 34 are connected in series to the second slider coil 24 of the slider 21.

The first excitation power supply 31 causes an excitation current Ia' expressed by the formula (4) shown below to flow through the first slider coil 23. Meanwhile, the second excitation power supply 32 causes an excitation current Ia" expressed by the formula (5) shown below to flow through the first slider coil 23. Accordingly, the excitation current Ia' and the excitation current Ia" are superimposed and a first excitation current Ia expressed by the formula (6) shown below flows through the first slider coil 23.

Moreover, the third excitation power supply 33 causes an excitation current Ib' expressed by the formula (7) shown below to flow through the second slider coil 24. Meanwhile, the fourth excitation power supply 34 causes an excitation current Ib" expressed by the formula (8) shown below to flow through the second slider coil 24. Accordingly, the excitation current Ib' and the excitation current Ib" are superimposed and a second excitation current Ib expressed by the formula (9) shown below flows through the second slider coil 24.

$$Ia'=-I\cos(k\alpha)\sin(\omega t) \quad (4)$$

$$Ia''=I'\sin(\omega' t) \quad (5)$$

$$Ia=-I\cos(k\alpha)\sin(\omega t)+I'\sin(\omega' t) \quad (6)$$

$$Ib'=I\sin(k\alpha)\sin(\omega t) \quad (7)$$

$$Ib''=I'\cos(\omega' t) \quad (8)$$

$$Ib=I\sin(k\alpha)\sin(\omega t)+I'\cos(\omega' t) \quad (9)$$

where

I, I': magnitudes of excitation currents k: $2\pi/p$ p: a value of one pitch of the coils (a length or an angle in the case of a rotary scale)

ω, ω': different angular frequencies of excitation currents (alternating currents) and $\omega'=(n+1/2)\omega$ (n: an integer) is satisfied t: a time point α: an excitation position Specifically, the first excitation current Ia obtained by adding the excitation current Ia" to the excitation current Ia' is made to flow through the first slider coil 23, the excitation current Ia' having a first angular frequency ω and being the same as the conventional excitation current, the excitation current Ia" having a second angular frequency ω' different from the first angular frequency ω. Moreover, the second excitation current Ib' obtained by adding the excitation current Ib" to the excitation current Ib' is made to flow through the second slider coil 24, the excitation current Ib' having the first angular frequency ω and being the same as the conventional excitation current, the excitation current Ib" having the second angular frequency ω' different from the first angular frequency ω.

In addition, the relationship between the first angular frequency ω and the second angular frequency ω' is such that $\omega'=(n+1/2)\omega$ (n: an integer) is satisfied.

The magnitudes I and I' respectively of the first excitation current Ia and the second excitation current Ib are appropriately set to magnitudes required to obtain a sufficient ratio of transfer between the slider 21 (the slider coils 23 and 24) and the scale 22 (scale coil 25) by electromagnetic induction.

When the first excitation current Ia flows through the first slider coil 23 and the second excitation current Ib flows through the second slider coil 24, an induced voltage V expressed by the formula (10) shown below is generated in the scale coil 25 by electromagnetic induction between the scale coil 25 and the group of the first slider coil 23 and the second slider coil 24. A voltage Vm and a voltage Vp which are components of the induced voltage V in the formula (10) are expressed respectively by the formulae (11) and (12) shown below.

$$V = Vm + Vp \qquad (10)$$

$$Vm = KI\sin(k(X-\alpha))\sin(\omega t) \qquad (11)$$

$$Vp = K'I'\sin(\omega' t + kX) \qquad (12)$$

where
K: a coefficient of transfer depending on a gap between the scale coil and the group of the first slider coil and the second slider coil and on the angular frequency ω of the excitation currents.
K': a coefficient of transfer depending on a gap between the scale coil and the group of the first slider coil and the second slider coil and on the angular frequency ω' of the excitation currents.
X: displacement of the detection unit (a moving position of the movable portion)

In the control unit 13 of the linear scale 11, a moving position X of the scale coil 25 and abnormality in the detection unit 12 of the linear scale 11 are both detected based on the induced voltage V generated in the scale coil 25.

To be more specific, the sampling part 41 of the control unit 13 is connected to the scale coil 25 of the detection unit 12. In the sampling part 41, the induced voltage V (=Vm+Vp) induced in the scale coil 25 is sampled. The timing of this sampling is described below.

When the Vm=0 is satisfied by adjusting the excitation position α to satisfy X=α, the peak value of Vm is also 0. Accordingly, processing may be performed by using values of the induced voltage V sampled at t=(2j+1)π/(2ω) (j: an integer) which is a timing at which Vm takes the peak value.

Assuming that Vm(j), Vp(j), and V(j) are respectively Vm, Vp, and V at a sampling point sampled at the timing of t=(2j+1)π/(2ω), Vm(j), Vp(j), and V(j) are expressed by the formulae (13), (14), and (15) shown below.

$$Vm(j) = KI\sin(k(X-\alpha))\sin(j\pi + \pi/2) \qquad (13)$$

$$Vp(j) = K'I'\sin(\omega'(2j+1)\pi/(2\omega) + kX) \qquad (14)$$

$$\begin{aligned} V(j) &= Vm(j) + Vp(j) \\ &= KI\sin(k(X-\alpha))\sin(j\pi + \pi/2) + \\ &\quad K'I'\sin(\omega'(2j+1)\pi/(2\omega) + kX) \end{aligned} \qquad (15)$$

Here, Vc and w are defined as follows.

$$Vc = KI\sin(k(X-\alpha))$$

$$w = n\pi/2 + j\pi/2 + \pi/4 + kX$$

When ω'=(n+1/2)ω (n: an integer) is satisfied, V(j) is expressed as shown in following the formula (16).

$$\begin{aligned} V(j) &= Vm(j) + Vp(j) \\ &= KI\sin(k(X-\alpha))\sin(j\pi + \pi/2) + \\ &\quad K'I'\sin((n+1/2)(j+1/2)\pi + kX) \end{aligned} \qquad (16)$$

$$\begin{aligned} &= KI\sin(k(X-\alpha))\sin(j\pi + \pi/2) + \\ &\quad K'I'\sin(nj\pi + n\pi/2 + j\pi/2 + \pi/4 + kX) \\ &= KI\sin(k(X-\alpha))\sin(j\pi + \pi/2) + \\ &\quad K'I'\sin(2mn\pi + n\pi/2 + j\pi/2 + \pi/4 + kX) \\ &= KI\sin(k(X-\alpha))\cos(j\pi) + \\ &\quad K'I'\sin(n\pi/2 + j\pi/2 + \pi/4 + kX) \\ &= Vc*\cos(j\pi) + K'I'\sin(n\pi/2 + j\pi/2 + \pi/4 + kX) \end{aligned}$$

Assuming that j=2m (m: integer) is satisfied, i.e. j is an even number and that Va(j) is the sum of samples of the induced voltage V at two sampling points of j and j+2, Va(j) is expressed as shown in the following formula (17).

$$\begin{aligned} Va(j) &= V(j) + V(j+2) \\ &= Vc*\cos(j\pi) + K'I'\sin(n\pi/2 + j\pi/2 + \pi/4 + kX) + \\ &\quad Vc*\cos(j\pi + 2\pi) + K'I'\sin(n\pi/2 + (j+2)\pi/2 + \pi/4 + kX) \\ &= 2Vc*\cos(2m\pi) + K'I'\sin(w) + K'I'\sin(w + \pi) \\ &= 2Vc + K'I'\sin(w) - K'I'\sin(w) \\ &= 2Vc \\ &= 2KI\sin(k(X-\alpha)) \end{aligned} \qquad (17)$$

In Va(j) of the formula (17), Vp is cancelled. Hence, as in the conventional case, the position X of the slider 21 can be detected by performing control of satisfying Va(j)=0 by causing the position X of the slider 21 to follow the excitation position α to satisfy X=α.

As described above, the sampling part 41 samples the induced voltage V (=Vm+Vp) from the scale 22 (the scale coil 25) of the detection unit 12, at the timing of t=(2j+1)π/(2ω) (j: an integer).

The Va(j) calculating part 42 calculates Va(J) on the basis of the induced voltage V sampled by the sampling part 41. Specifically, the Va(j) calculating part 42 selects the samples of the induced voltage V at the two sampling points of j and j+2, where j is an even number, from the samples of the induced voltage V obtained by the sampling part 41, and then calculates the sum (i.e. Va(j)) of the samples the induced voltage V at the two sampling points. As a result, Va(j) as shown in the abovementioned formula (17) is obtained.

The α calculating part 43 calculates the value of the excitation position α at which Va(j) calculated by the Va(j) calculating part 42 is equal to 0 (i.e. the excitation position α at which X=α is satisfied) and outputs the thus-calculated excitation position α as the detected position X of the slider 21. Specifically, the position X is detected by performing the control of satisfying Va(j)=0 by causing the position X to follow the excitation position α to satisfy X=α, and the detected position X is then outputted. Moreover, the α calculating part 43 outputs the thus-calculated excitation position α to the signal generator 44, so that the first excitation current Ia and the second excitation current Ib can be adjusted based on the thus-calculated excitation position α.

The signal generator 44 generates two types of sine wave signals of the aforementioned formulae (4) and (7) which are adjusted based on the excitation position α calculated by the α calculating part 43. The two types of sine waves signals generated by the signal generator 44 are inputted respectively into the first excitation power supply 31 and the third excitation power supply 33 which are connected to the signal generator 44. The first excitation power supply 31 and the third excitation power supply 33 cause the excitation current Ia' and the excitation current Ib' adjusted to be the respective sine wave signals to flow through the first slider coil 23 and the second slider coil 24, respectively. Thus, loop processing similar to conventional loop processing is performed.

Meanwhile, when abnormality occurs in the detection unit 12 of the linear scale 11 and the induced voltage V becomes abnormally small, particularly when V becomes equal to 0, V remains to be 0 even if the slider 21 actually moves and the position X thereof changes. Accordingly, the position X of the slider 21 cannot be accurately detected.

To counter this problem, the Vb(j) calculating part 45 and the abnormality determination part 46 perform processing for detecting abnormality in the linear scale 11 (the detection unit 12).

First, description is given of a threshold value L used by the abnormality determination part 46 to determine whether the linear scale 11 (the detection unit 12) is in an abnormal state. The samples of the induced voltage V at four sampling points of j, j+1, j+2, and j+3, where j is an even number (2m), are selected from the samples of the induced voltage V obtained by the sampling part 41 at the timing of $t=(2j+1)\pi/(2\omega)$ (j: an integer) and Vb(j) is assumed to be the sum of the absolute values $|V(j)|$, $|V(j+1)|$, $|V(j+2)|$, and $|V(j+3)|$ of the induced voltage V at the sampling points.

The absolute values $|V(j)|$, $|V(j+1)|$, $|V(j+2)|$, and $|V(j+3)|$ of the induced voltage V are expressed as shown respectively by the following formulae (18), (19), (20), and (21). Moreover, Vb(j) is expressed as shown in the following formula (22).

$$|V(j)| = |Vc * \cos(j\pi) + K'I'\sin(n\pi/2 + j\pi/2 + \pi/4 + kX)| \quad (18)$$
$$= |Vc * \cos(j\pi) + K'I'\sin(w)|$$
$$= |Vc + K'I'\sin(w)|$$

$$|V(j+1)| = |Vc * \cos(j\pi + \pi) + \quad (19)$$
$$K'I'\sin(n\pi/2 + j\pi/2 + \pi/4 + kX + \pi/2)|$$
$$= |-Vc * \cos(j\pi) + K'I'\cos(w)|$$
$$= |-Vc + K'I'\cos(w)|$$

$$|V(j+2)| = |Vc * \cos(j\pi + 2\pi) + \quad (20)$$
$$K'I'\sin(n\pi/2 + j\pi/2 + \pi/4 + kX + \pi)|$$
$$= |Vc * \cos(j\pi) - K'I'\sin(w)|$$
$$= |-Vc + K'I'\sin(w)|$$

$$|V(j+3)| = |Vc * \cos(j\pi + 3\pi) + \quad (21)$$
$$K'I'\sin(n\pi/2 + j\pi/2 + \pi/4 + kX + 3\pi/2)|$$
$$= |Vc * \cos(j\pi + \pi) -$$
$$K'I'\sin(n\pi/2 + j\pi/2 + \pi/4 + kX + \pi/2)|$$
$$= |-Vc * \cos(j\pi) - K'I'\cos(w)|$$
$$= |Vc + K'I'\cos(w)|$$

$$|Vb(j)| = |V(j)| + |V(j+1)| + |V(j+2)| + |V(j+3)| \quad (22)$$
$$= |Vc + K'I'\sin(w)| + |-Vc + K'I'\cos(w)| +$$
$$|-Vc + K'I'\sin(w)| + |Vc + K'I'\cos(w)|$$
$$= |Vc + K'I'\sin(w)| + |-Vc + K'I'\sin(w)| +$$
$$|Vc + K'I'\cos(w)| + |-Vc + K'I'\cos(w)|$$

The formula (23) shown below on Vb(j) is obtained from the formula (22) shown above. Furthermore, the formula (24) shown below is obtained by sequentially calculating the formula (23) shown below.

Then, the formula (25) shown below on Vb(j) is obtained from the formula (24) shown below.

$$Vb(j) \geq |Vc + K'I'\sin(w) - Vc + K'I'\sin(w)| + \quad (23)$$
$$|Vc + K'I'\cos(w) - Vc + K'I'\cos(w)| \quad (24)$$
$$= 2|K'I'\sin(w)| + 2|K'I'\cos(w)|$$
$$= 2K'I'|\sin(w)| + |\cos(w)|$$
$$= 2K'I'\sqrt{(|\sin(w)| + |\cos(w)|)^2}$$
$$= 2K'I'\sqrt{(|\sin(w)|^2 + |\cos(w)|^2 + 2|\sin(w)||\cos(w)|)}$$
$$= 2K'I'\sqrt{(1 + 2|\sin(w)||\cos(w)|)}$$

$$Vb(j) \geq 2K'I' \quad (25)$$

Accordingly, when the detection unit 12 of the linear scale 11 is normally operating, the value of Vb(j) is always equal to or greater than 2K'I' (K': the coefficient of transfer depending on the gap between the scale coil and the group of the first slider coil and the second slider coil and on the angular frequency ω' of the excitation currents, I': the magnitude of the excitation currents). Hence, whether the detection unit 12 of the linear scale 11 is in an abnormal state or not can be determined by setting the threshold value L in a range of 0≤L<2K'I' and then comparing the value of Vb(j) with the threshold value L.

In this respect, the Vb(j) calculating part 45 calculates Vb(j) on the basis of samples of the induced voltage V at multiple sampling points obtained by the sampling part 41 at the timing of $t=(2j+1)\pi/(2\omega)$ (j: an integer). Specifically, the Vb(j) calculating part 45 selects samples of the induced voltage V at the four sampling points of j, j+1, j+2, and j+3, where j is an even number (2m), from the samples of the induced voltage V obtained by the sampling part 41 at the timing of $t=(2j+1)\pi/(2\omega)$ (j: an integer), and then calculates the sum (i.e. Vb(j)) of the absolute values $|V(j)|$, $|V(j+1)|$, $|V(j+2)|$, and $|V(j+3)|$ of the induced voltage V at the four sampling points.

Subsequently, the abnormality determination part 46 compares Vb(j) calculated by the Vb(j) calculating part 45 with the threshold value L previously set in the range of 0≤L<2K'I' and stored, and determines whether Vb(j) is equal to or lower than L (Vb(j)≤L). Then, when Vb(j) is equal to or lower than L (Vb(j)≤L) (in the case of YES), the abnormality determination part 46 determines that the linear scale 11 (detection unit 12) is in an abnormal state and outputs an alarm.

As described above, according to Embodiment 1, the linear scale 11 includes: the detection unit 12 including the slider 21 and the scale 22, the slider 21 including the first slider coil 23 and the second slider coil 24, the scale 22 including the scale coil 25 and arranged in parallel to the slider 21 to face the slider 21; and the control unit 13, wherein the control unit 13 includes: the excitation current supplying means (the first excitation power supply 31, the second excitation power supply 32, the third excitation power supply 33, and the fourth excitation power supply 34) for causing the first excitation current Ia described above to flow through the first slider coil 23 and causing the second excitation current Ib described above to flow through the second slider coil 24; the sampling means (the sampling part 41) for sampling the induced voltage V induced in the scale coil 25, at the timing of $t=(2j+1)\pi/(2\omega)$ (j: an integer) the position detecting means (the Va(j) calculating part 42 and the α calculating part 43) for selecting samples of the induced voltage V at the sampling points j and j+2, where j is an even number, from the samples of the induced voltage V obtained by the sampling means, calculating Va(j) which is the sum of the samples of V(j) and V(j+2) of the induced voltage V at the sampling points, calculating the excitation position α at which the thus-calculated Va(j) is equal to 0, and setting the thus-calculated α as the detected position X; and abnormality detecting means (the Vb(j) calculating part 45 and the abnormality determination part 46) for selecting samples of the induced voltage V at the sampling points of j, j+1, j+2, and j+3, where j is an even number, from the samples of the induced voltage V obtained by the sampling means, calculating Vb(j) which is the sum of the absolute values |V(j)|, |V(j+1)|, |V(j+2)|, and |V(j+3)| of the induced voltage V at the sampling points, comparing the thus-calculated Vb(j) with the threshold value L set to be in the range of 0≤L<2K' I, and determining that the linear scale 11 (the detection unit 12) is in an abnormal state when the Vb(j) is equal to or lower than the threshold value L. Accordingly, the abnormality detection of the linear scale 11 (detection unit 12) and the detection of the position X can be performed in a simple process by using the excitation currents Ia and Ib each having the two different angular frequencies ω and ω' with no adverse effect on the position detection accuracy. Hence, it is possible to prevent erroneous detection and improve safety. In addition, although the excitation currents each having the two different angular frequencies ω and ω' are used, it is unnecessary to provide circuits such as a frequency separation filter and a phase detection circuit in the control unit 13. Thus, the cost can be reduced.

Embodiment 2

An electromagnetic induction type position detector of Embodiment 2 of the present invention is described. Since the configuration of the electromagnetic induction type position detector of Embodiment 2 is the same as that of Embodiment 1 described above, description is given by using FIG. 1 also in this embodiment.

In FIG. 1, a linear scale 11 of Embodiment 2 of the present invention is the same as the linear scale 11 of Embodiment 1 described above in terms of processing of position detection performed by a Va(j) calculating part 42, an α calculating part 43, and a signal generator 44 on the basis of an induced voltage V sampled by a sampling part 41. However, the linear scale 11 of Embodiment 2 is different in terms of processing of abnormality detection performed by a Vb(j) calculating part 45 and an abnormality determination part 46 on the basis of the induced voltage V sampled by the sampling part 41.

In this respect, detailed description is given of the processing of abnormality detection performed the Vb(j) calculating part 45 and the abnormality determination part 46.

First, description is given of a threshold value L used by the abnormality determination part 46 to determine whether the linear scale 11 (a detection unit 12) is in an abnormal state.

Samples of the induced voltage V at sampling points of j, j+1, j+2, and j+3 as well as sampling points of j+4, j+4+1, j+4+2, j+4+3, . . . , j+4u, j+4u+1, j+4u+2, and j+4u+3 (u: an integer), where j is an even number (2m), are selected from the samples of the induced voltage V obtained by the sampling part 41 at the timing of t=(2j+1)π/(2ω) (j: an integer) and Vb(j) is assumed to be the sum of the absolute values |V(j)|, |V(j+1)|, |V(j+2)|, |V(j+3)|, |V(j+4)|, |V(j+4+1)|, |V(j+4+2)|, |V(j+4+3)|, . . . , |V(j+4u)|, |V(j+4u+1)|, |V(j+4u+2)|, and |V(j+4u+3)| (u: an integer) of the induced voltage V at the sampling points.

The absolute values |V(j)|, |V(j+1)|, |V(j+2)|, and |V(j+3)| of the induced voltage V are expressed as shown respectively by the aforementioned formulae (18), (19), (20), and (21).

The absolute values |V(j+4u)|, |V(j+4u+1)|, |V(j+4u+2)|, and |V(j+4u+3)| of the induced voltage V are expressed as shown respectively by the following formulae (26), (27), (28), and (29). Note that the absolute values |V(j+4)|, |V(j+4+1)|, |V(j+4+2)|, and |V(j+4+3)| of the induced voltage V correspond to the case where u=1 is satisfied in the following formulae (26), (27), (28), and (29). Moreover, Vb(j) is expressed as shown in the following formula (30).

$$\begin{aligned}|V(j+4u)| &= |Vc*\cos((j+4u)\pi) + \\ &\quad K'I'\sin(n\pi/2 + (j+4u)\pi/2 + \pi/4 + kX)| \\ &= |Vc*\cos(j\pi) + K'I'\sin(n\pi/2 + j\pi/2 + \pi/4 + kX)| \\ &= |Vc*\cos(j\pi) + K'I'\sin(w)| \\ &= Vc + K'I'\sin(w)\end{aligned} \quad (26)$$

$$\begin{aligned}|V(j+4u+1)| &= |Vc*\cos((j+4u+1)\pi) + \\ &\quad K'I'\sin(n\pi/2 + (j+4u+1)\pi/2 + \pi/4 + kX)| \\ &= |Vc*\cos(j\pi + \pi) + K'I'\sin(w+\pi/2)| \\ &= |Vc*\cos(\pi) + K'I'\cos(w)| \\ &= |-Vc + K'I'\cos(w)|\end{aligned} \quad (27)$$

$$\begin{aligned}|V(j+4u+2)| &= |Vc*\cos((j+4u+2)\pi) + \\ &\quad K'I'\sin(n\pi/2 + (j+4u+2)\pi/2 + \pi/4 + kX)| \\ &= |Vc*\cos(j\pi) + K'I'\sin(w+\pi)| \\ &= |Vc*\cos(j\pi) - K'I'\sin(w)| \\ &= |-Vc + K'I'\sin(w)|\end{aligned} \quad (28)$$

$$\begin{aligned}|V(j+4u+3)| &= |Vc*\cos((j+4u+3)\pi) + \\ &\quad K'I'\sin(n\pi/2 + (j+4u+3)\pi/2 + \pi/4 + kX)| \\ &= |Vc*\cos((j+1)\pi) + K'I'\sin(w+3\pi/2)| \\ &= |Vc*\cos(\pi) - K'I'\cos(w)| \\ &= |Vc + K'I'\cos(w)|\end{aligned} \quad (29)$$

$$\begin{aligned}|Vb(j)| &= |V(j)| + |V(j+1)| + |V(j+2)| + |V(j+3)| + \\ &\quad |V(j+4)| + |V(j+4+1)| + |V(j+4+2)| + \\ &\quad |V(j+4+3)| + \ldots + |V(j+4u)| + |V(j+4u+1)| + \\ &\quad |V(j+4u+2)| + |V(j+4u+3)| \\ &= (u+1)(|Vc+K'I'\sin(w)| + |-Vc+K'I'\cos(w)| + \\ &\quad |-Vc+K'I'\sin(w)| + |Vc+K'I'\cos(w)|) \\ &= (u+1)(|Vc+K'I'\sin(w)| + |-Vc+K'I'\sin(w)| + \\ &\quad |Vc+K'I'\cos(w)| + |-Vc+K'I'\cos(w)|)\end{aligned} \quad (30)$$

The formula (31) shown below on Vb(j) is obtained from the formula (30) shown above. Furthermore, the formula (32) shown below is obtained by sequentially calculating the formula (31) shown below.

Then, the formula (33) shown below on Vb(j) is obtained from the formula (32) shown below.

$$\begin{aligned}Vb(j) &\geq (u+1)(|Vc+K'I'\sin(w) - Vc+K'I'\sin(w)| + \quad (31) \\ &\quad |Vc+K'I'\cos(w) - Vc+K'I'\cos(w)|) \quad (32) \\ &= 2(u+1)|K'I'\sin(w)| + 2|K'I'\cos(w)| \\ &= 2K'I'(u+1)|\sin(w)| + |\cos(w)| \\ &= 2K'I'(u+1)\sqrt{(|\sin(w)| + |\cos(w)|)^2} \\ &= 2K'I'(u+1)\sqrt{|\sin(w)|^2 + |\cos(w)|^2 + 2|\sin(w)||\cos(w)|} \\ &= 2K'I'(u+1)\sqrt{(1+2|\sin(w)||\cos(w)|)}\end{aligned}$$

$$Vb(j) \geq 2(u+1)2K'I' \quad (33)$$

Accordingly, when the detection unit 12 of the linear scale 11 is normally operating, the value of Vb(j) is always equal to or greater than 2(u+1)K'I' (K': a coefficient of transfer depending on a gap between a scale coil and a group of a first slider coil and a second slider coil and on an angular frequency ω' of an excitation currents, I': the magnitude of the excitation currents). Hence, whether the detection unit 12 of the linear scale 11 is in an abnormal state or not can be determined by setting the threshold value L in a range of 0≤L<2(u+1)K'I' and then comparing the value of the Vb(j) with the threshold value L.

In this respect, the Vb(j) calculating part 45 calculates Vb(j) on the basis of the samples of the induced voltage V at multiple sampling points obtained by the sampling part 41 at a timing of t=(2j+1)π/(2ω) (j: an integer). Specifically, the Vb(j) calculating part 45 selects the samples of the induced voltage V at the sampling points of j, j+1, j+2, and j+3 as well as the sampling points of j+4, j+4+1, j+4+2, j+4+3, ..., j+4u, j+4u+1, j+4u+2, and j+4u+3 (u: an integer), where j is an even number (2m), from the samples of the induced voltage V obtained by the sampling part 41 at the timing of t=(2j+1)π/(2ω) (j: an integer), and then calculates the sum (i.e. Vb(j)) of the absolute values |V(j)|, |V(j+1)|, |V(j+2)|, |V(j+3)|, |V(j+4)|, |V(j+4+1)|, |V(j+4+2)|, |V(j+4+3)|, ..., |V(j+4u)|, |V(j+4u+1)|, |V(j+4u+2)|, and |V(j+4u+3)| (u: an integer) of the induced voltage V at the sampling points.

The abnormality determination part 46 compares Vb(j) calculated by the Vb(j) calculating part 45 with the threshold value L previously set in the range of 0≤L<2(u+1)K'I' and stored, and determines whether the Vb(j) is equal to or lower than L (Vb(j)≤L). Then, when consequently determining that Vb(j) is equal to or lower than L (Vb(j)≤L) (in the case of YES), the abnormality determination part 46 determines that the linear scale 11 (detection unit 12) is in an abnormal state and outputs an alarm.

Other configurations and contents of processing in the linear scale 11 of Embodiment 2 are the same as those of the linear scale 11 of Embodiment 1. Accordingly, description thereof is omitted herein.

As described above, according to Embodiment 2, the linear scale 11 includes: the detection unit 12 including a slider 21 and a scale 22, the slider 21 including a first slider coil 23 and a second slider coil 24, the scale 22 including a scale coil 25 and arranged in parallel to the slider 21 to face the slider 21; and the control unit 13, wherein the control unit 13 includes: excitation current supplying means (a first excitation power supply 31, a second excitation power supply 32, a third excitation power supply 33, and a fourth excitation power supply 34) for causing the first excitation current Ia described above to flow through the first slider coil 23 and causing the second excitation current Ib described above to flow through the second slider coil 24; sampling means (the sampling part 41) for sampling the induced voltage V induced in the scale coil 25, at the timing of t=(2j+1)π/(2ω) (j: an integer); position detecting means (the Va(j) calculating part 42 and the α calculating part 43) for selecting the samples of the induced voltage V at the sampling points j and j+2, where j is an even number, from the samples of the induced voltage V obtained by the sampling means, calculating Va(j) which is the sum of the samples of V(j) and V(j+2) of the induced voltage V at the sampling points, calculating the excitation position α at which the thus-calculated Va(j) is equal to 0, and setting the thus-calculated α as the detected position X; and abnormality detecting means (the Vb(j) calculating part 45 and the abnormality determination part 46) for selecting the samples of the induced voltage V at the sampling points of j, j+1, j+2, and j+3 as well as the sampling points of j+4, j+4+1, j+4+2, j+4+3, ..., j+4u, j+4u+1, j+4u+2, and j+4u+3 (u: an integer), where j is an even number, from the samples of the induced voltage V obtained by the sampling means, calculating Vb(j) which is the sum of the absolute values |V(j)|, |V(j+1)|, |V(j+2)|, |V(j+3)|, |V(j+4)|, |V(j+4+1)|, |V(j+4+2)|, |V(j+4+3)|, ..., |V(j+4u)|, |V(j+4u+1)|, |V(j+4u+2)|, and |V(j+4u+3)| (u: an integer) of the induced voltage V at the sampling points, comparing the thus-calculated Vb(j) with the threshold value L set to be in the range of 0≤L<2(u+1)K'I', and determining that the linear scale 11 (the detection unit 12) is in an abnormal state when the Vb(j) is equal to or lower than the threshold value L. Accordingly, the abnormality detection of the linear scale 11 (the detection unit 12) and the detection of the position X can be performed in a simple process by using the excitation currents Ia and Ib each having the two different angular frequencies ω and ω' with no adverse effect on the position detection accuracy. Hence, it is possible to prevent erroneous detection and improve safety. In addition, although the excitation currents each having the two different angular frequencies are used, it is unnecessary to provide circuits such as a frequency separation filter and a phase detection circuit in the control unit 13. Thus, the cost can be reduced.

Although the linear scale is given as an example of the electromagnetic induction type position detector in the above description, the present invention is not limited to this and can be also applied to a rotary scale.

The outline of the rotary scale is described. The rotary scale includes a detection unit and a control unit. The detection unit of the rotary scale is the same as that of a conventional rotary scale and includes a stator which is a primary-side member and a rotor which is a secondary-side member. The stator which is a fixed portion has a first stator coil which is a first primary-side coil and a second stator coil which is a second primary-side coil. Meanwhile, the rotor which is a rotating portion has a rotor coil which is a secondary-side coil. Each of these coils are formed to bend back and forth in a zigzag shape and to have an annular shape as a whole. The stator (the first stator coil and the second stator coil) and the rotor (rotor coil) are arranged in parallel to face each other with a predetermined gap maintained therebetween. Moreover, the first stator coil and the second stator coil are shifted from each other by ¼ pitch.

In the control unit of the rotary scale, processing similar to that performed in the control unit 13 of the linear scale 11 described above is performed based on induced voltage generated in the detection unit (rotor coil).

INDUSTRIAL APPLICABILITY

The present invention is related to an electromagnetic induction type position detector such as a linear scale and is useful when applied to a case where abnormality detection and position detection are to be easily performed in a simple configuration in which no filter circuit, phase detection circuit or the like is required to be provided in a control unit.

REFERENCE SIGNS LIST

11 LINEAR SCALE
12 DETECTION UNIT
13 CONTROL UNIT
21 SLIDER
22 SCALE
23 FIRST SLIDER COIL
24 SECOND SLIDER COIL
25 SCALE COIL
31 FIRST EXCITATION POWER SUPPLY

32 SECOND EXCITATION POWER SUPPLY
33 THIRD EXCITATION POWER SUPPLY
34 FOURTH EXCITATION POWER SUPPLY
41 SAMPLING PART
42 Va(j) CALCULATING PART
43 α CALCULATING PART
44 SIGNAL GENERATOR
45 Vb(j) CALCULATING PART
46 ABNORMALITY DETERMINATION PART

The invention claimed is:

1. A position detector using electromagnetic induction, comprising:
a detection unit including a primary-side member and a secondary-side member, the primary-side member including a first primary-side coil and a second primary-side coil, the secondary-side member including a secondary-side coil and arranged in parallel to the primary-side member to face the primary-side member; and
a control unit, wherein
the control unit includes:
excitation current supplying means for causing a first excitation current Ia to flow through the first primary-side coil and causing a second excitation current Ib to flow through the second primary-side coil,
where $$Ia = -I\cos(k\alpha)\sin(\omega t) + I'\sin(\omega' t)$$

$$Ib = I\sin(k\alpha)\sin(\omega t) + I'\cos(\omega' t)$$

provided that
I, I': magnitudes of the excitation currents
k: $2\pi/p$
p: a value of one pitch of the coils
$\omega$, $\omega'$: different angular frequencies of the excitation currents and $\omega' = (n+1/2)\omega$ (n: an integer) is satisfied
t: a time point
α: an excitation position;
sampling means for sampling an induced voltage V induced in the secondary-side coil, at a timing of $t=(2j+1)\pi/(2\omega)$ (j: an integer); and
abnormal state detecting means for selecting samples of the induced voltage V at a plurality of sampling points from the samples of the induced voltage V obtained by the sampling means, calculating Vb(j) which is a sum of absolute values of the samples of the induced voltage V at the sampling points, comparing the thus-calculated Vb(j) with a threshold value L, and determining that the position detector is in an abnormal state when the Vb(j) is equal to or lower than the threshold value L.

2. The position detector according to claim 1, wherein the abnormal state detecting means
selects samples of the induced voltage V at sampling points of j, j+1, j+2, and j+3, where j is an even number, from the samples of the induced voltage V obtained by the sampling means, and calculates Vb(j) which is a sum of absolute values |V(j)|, |V(j+1)|, |V(j+2)|, and |V(j+3)| of the samples of the induced voltage V at the sampling points, and
compares the thus-calculated Vb(j) with the threshold value L set to be in a range of 0≤L<2K'I' (K': a coefficient of transfer depending on a gap between the secondary-side coil and a group of the first primary-side coil and the second primary-side coil and on the angular frequency ω' of the excitation currents), and determines that the position detector is in an abnormal state when the Vb(j) is equal to or lower than the threshold value L.

3. The position detector according to claim 2 further comprising:
position detecting means for selecting samples of the induced voltage V at a plurality of sampling points from the samples of the induced voltage V obtained by the sampling means, calculating Va(j) which is a sum of the samples of the induced voltage V at the sampling points, calculating an excitation position α at which the thus-calculated Va(j) is equal to 0, and setting the thus-calculated α as a detected position X.

4. The position detector according to claim 3, wherein the position detecting means
selects samples of the induced voltage V at sampling points of j and j+2, where j is an even number, from the samples of the induced voltage V obtained by the sampling means, and calculates Va(j) which is a sum of the samples of V(j) and V(j+2) of the induced voltage V at the sampling points, and
calculates the excitation position α at which the thus-calculated Va(j) is equal to 0, and sets the thus-calculated α as the detected position X.

5. The position detector according to claim 1, wherein the abnormal state detecting means
selects samples of the induced voltage V at sampling points of j, j+1, j+2, and j+3 as well as sampling points of j+4, j+4+1, j+4+2, j+4+3, . . . , j+4u, j+4u+1, j+4u+2, and j+4u+3 (u: an integer), where j is an even number, from the samples of the induced voltage V obtained by the sampling means, and calculates Vb(j) which is a sum of absolute values |V(j)|, |V(j+1)|, |V(j+2)|, |V(j+3)|, |V(j+4)|, |V(j+4+1)|, |V(j+4+2)|, |V(j+4+3)|, . . . , |V(j+4u)|, |V(j+4u+1)|, |V(j+4u+2)|, and |V(j+4u+3)| (u: an integer) of the samples of the induced voltage V at the sampling points, and
compares the thus-calculated Vb(j) with the threshold value L set to be within a range of 0≤L<2(u+1)K'I' (K': a coefficient of transfer depending on a gap between the secondary-side coil and a group of the first primary-side coil and the second primary-side coil and on the angular frequency ω' of the excitation currents), and determines that the position detector is in an abnormal state when the Vb(j) is equal to or lower than the threshold value L.

6. The position detector according to claim 5, further comprising:
position detecting means for selecting samples of the induced voltage V at a plurality of sampling points from the samples of the induced voltage V obtained by the sampling means, calculating Va(j) which is a sum of the samples of the induced voltage V at the sampling points, calculating an excitation position α at which the thus-calculated Va(j) is equal to 0, and setting the thus-calculated α as a detected position X.

7. The position detector according to claim 6, wherein the position detecting means
selects samples of the induced voltage V at sampling points of j and j+2, where j is an even number, from the samples of the induced voltage V obtained by the sampling means, and calculates Va(j) which is a sum of the samples of V(j) and V(j+2) of the induced voltage V at the sampling points, and
calculates the excitation position α at which the thus-calculated Va(j) is equal to 0, and sets the thus-calculated α as the detected position X.

8. The position detector according to claim 1, further comprising:
    position detecting means for selecting samples of the induced voltage V at a plurality of sampling points from the samples of the induced voltage V obtained by the sampling means, calculating Va(j) which is a sum of the samples of the induced voltage V at the sampling points, calculating an excitation position $\alpha$ at which the thus-calculated Va(j) is equal to 0, and setting the thus-calculated $\alpha$ as a detected position X.

9. The position detector according to claim 8, wherein
the position detecting means
    selects samples of the induced voltage V at sampling points of j and j+2, where j is an even number, from the samples of the induced voltage V obtained by the sampling means, and calculates Va(j) which is a sum of the samples of V(j) and V(j+2) of the induced voltage V at the sampling points, and
    calculates the excitation position $\alpha$ at which the thus-calculated Va(j) is equal to 0, and sets the thus-calculated $\alpha$ as the detected position X.

* * * * *